(12) United States Patent
Chamot et al.

(10) Patent No.: US 12,448,992 B2
(45) Date of Patent: Oct. 21, 2025

(54) AIR PROCESSING UNIT, AIR MANAGING SYSTEM, PNEUMATIC SYSTEM AND VEHICLE

(71) Applicant: ZF CV SYSTEMS GLOBAL GMBH, Bern (CH)

(72) Inventors: Marcin Chamot, Wroclaw (PL); Maciej Semeniuk, Wroclaw (PL); Frank Adrianus Cornelis Josephus Van Son, Tilburg (NL)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 343 days.

(21) Appl. No.: 18/137,585

(22) Filed: Apr. 21, 2023

(65) Prior Publication Data

US 2023/0340974 A1 Oct. 26, 2023

(30) Foreign Application Priority Data

Apr. 21, 2022 (EP) .................................. 22169233

(51) Int. Cl.
*F15B 21/04* (2019.01)
*B01D 53/26* (2006.01)
*B01D 53/30* (2006.01)
*F15B 13/044* (2006.01)

(52) U.S. Cl.
CPC .............. *F15B 21/04* (2013.01); *B01D 53/26* (2013.01); *B01D 53/30* (2013.01); *F15B 13/044* (2013.01); *B01D 2257/80* (2013.01); *B01D 2259/4566* (2013.01)

(58) Field of Classification Search
CPC ........ B01D 53/02; B01D 53/26; B01D 53/30; B01D 2257/80; B01D 2259/4556; F15B 21/04; F15B 13/044
See application file for complete search history.

(56) References Cited

U.S. PATENT DOCUMENTS 6,077,330 A * 6/2000 Sabelstrom .......... B01D 53/261
96/111
6,079,436 A * 6/2000 Delfs ...................... B60T 17/02
137/115.19
6,089,831 A * 7/2000 Bruehmann ....... B60G 17/0526
417/302

(Continued)

FOREIGN PATENT DOCUMENTS

EP 3048019 A1 7/2016
EP 3878704 A1 9/2021

*Primary Examiner* — Duane Smith
(74) *Attorney, Agent, or Firm* — WARNER NORCROSS + JUDD LLP (57) ABSTRACT

An air processing unit for providing compressed air to a supply port for use in a pneumatic system with a pneumatic unit pneumatically connected to the supply port. The air processing unit comprises an inlet port for receiving the compressed air from an electrically controlled compressed air supply. An air drying unit having an input port pneumatically connected to the inlet port and configured to dry the compressed air received, a supply line configured to supply dried compressed air, a return flow control unit comprising an electrically controlled valve are also included in the air processing unit. The electrically controlled valve is provided as a single and only electrically controlled valve of the return flow control unit.

13 Claims, 5 Drawing Sheets

(56) References Cited

U.S. PATENT DOCUMENTS

| | | | |
|---|---|---|---|
| 6,640,463 B1* | 11/2003 | Beck | B60T 17/004 34/558 |
| 10,391,993 B2* | 8/2019 | Czapiewska | F15B 21/041 |
| 2005/0258680 A1* | 11/2005 | Blackwood | B60T 17/004 303/2 |
| 2007/0096554 A1* | 5/2007 | Detlefs | B60T 17/02 303/127 |
| 2007/0246998 A1* | 10/2007 | Diekmeyer | B60T 17/004 303/9.61 |
| 2007/0246999 A1* | 10/2007 | Hilberer | B60T 17/02 700/282 |
| 2007/0262280 A1* | 11/2007 | Detlefs | B60T 8/885 251/129.01 |
| 2008/0007111 A1* | 1/2008 | Detlefs | B60T 11/326 303/3 |
| 2008/0040013 A1* | 2/2008 | Detlefs | B60T 17/22 701/78 |
| 2008/0173173 A1* | 7/2008 | Hilberer | B01D 53/261 95/10 |
| 2009/0133396 A1* | 5/2009 | Wustefeld | F04B 49/002 60/452 |
| 2010/0036576 A1* | 2/2010 | Diekmeyer | B60T 17/02 303/9.66 |
| 2010/0065129 A1* | 3/2010 | Schnittger | B60T 17/02 137/15.04 |
| 2010/0071779 A1* | 3/2010 | Bordacs | B60T 17/004 137/15.01 |
| 2010/0074764 A1* | 3/2010 | Schnittger | B60T 17/04 417/279 |
| 2010/0236653 A1* | 9/2010 | Hilberer | B60T 17/004 137/870 |
| 2010/0269926 A1* | 10/2010 | Hilberer | B60T 17/004 137/511 |
| 2011/0052419 A1* | 3/2011 | Bordacs | B60T 17/004 417/302 |
| 2011/0139263 A1* | 6/2011 | Hilberer | B60T 17/02 137/565.01 |
| 2011/0259189 A1* | 10/2011 | Diekmeyer | B60T 17/004 96/111 |
| 2011/0278804 A1* | 11/2011 | Folchert | B01D 53/261 280/5.503 |
| 2012/0285327 A1* | 11/2012 | Schal | B60T 17/18 96/113 |
| 2012/0319464 A1* | 12/2012 | Lloyd | B60T 17/22 303/3 |
| 2013/0276899 A1* | 10/2013 | Frank | F15B 13/022 137/198 |
| 2013/0304329 A1* | 11/2013 | Feyerabend | B60T 17/004 701/70 |
| 2014/0054956 A1* | 2/2014 | Kaupert | B60T 17/221 303/82 |
| 2014/0237962 A1* | 8/2014 | Ginder | B01D 53/266 55/420 |
| 2015/0224438 A1* | 8/2015 | Brinkmann | B01D 53/0454 95/21 |
| 2015/0251645 A1* | 9/2015 | Pfefferl | B01D 53/261 95/21 |
| 2017/0036162 A1* | 2/2017 | Hoeldrich | B60C 23/00354 |
| 2017/0095767 A1* | 4/2017 | Miehe | B01D 53/266 |
| 2017/0129300 A1* | 5/2017 | Frank | B01D 53/26 |
| 2017/0152875 A1* | 6/2017 | Frank | B60G 11/27 |
| 2017/0165605 A1* | 6/2017 | Minato | B01D 53/26 |
| 2019/0316610 A1* | 10/2019 | Chamot | F15B 21/048 |
| 2020/0240446 A1* | 7/2020 | Schnittger | B01D 53/0446 |
| 2021/0093991 A1* | 4/2021 | Schnittger | B01D 53/261 |
| 2021/0404490 A1* | 12/2021 | Zeman | F15B 13/024 |
| 2022/0097668 A1* | 3/2022 | Brinkmann | B60Q 9/00 |
| 2022/0097688 A1* | 3/2022 | Hanselmann | B60W 30/095 |
| 2022/0135092 A1* | 5/2022 | Herden | F04B 41/00 701/19 |
| 2022/0193599 A1* | 6/2022 | Moon | B60T 17/00 |
| 2022/0194342 A1* | 6/2022 | Moon | B60G 13/10 |
| 2022/0412382 A1* | 12/2022 | Zawisza | B01D 53/047 |
| 2024/0149856 A1* | 5/2024 | Hurley | G05D 16/2022 |
| 2025/0137542 A1* | 5/2025 | Semeniuk | F16K 11/22 |

* cited by examiner

FIG. 1 (Comparative example)

AIR PROCESSING UNIT, AIR MANAGING SYSTEM, PNEUMATIC SYSTEM AND VEHICLE

CROSS-REFERENCE TO RELATED APPLICATIONS

This application claims priority to and all advantages of European Patent Application No. 22169233.8, filed on 21 Apr. 2022, the contents of which are hereby incorporated by reference.

FIELD OF THE DISCLOSURE

The invention is directed to an air processing unit for providing compressed air to a supply port, in particular for use in a pneumatic system pneumatically connected to the supply port, preferably wherein the pneumatic system is adapted for a vehicle. The invention is also directed to an air managing system, to a pneumatic system and to a vehicle.

BACKGROUND

In traditional internal-combustion-engine (ICE) truck systems, electronically controlled and electronic air drying/air processing units are configured to control also compressors, by providing a suitable pneumatic signal for the compressor to cut out the discharge line, typically by means of a governor, by providing a control pressure to a compressor control port.

However, in autonomous, connected, electric (ACE) vehicles, it is advantageous to use an electronically controlled compressor that is controlled only by electronic input via a controller area network (CAN) is used.

Current available systems, irrespectively of whether they are used in ICE or ACE vehicles, all include a dedicated valve for pneumatically controlling the compressor. Typically, the air processing unit provides control pressure on a dedicated port for controlling the governor and an opening of the purge valve. Alternatively, the air processing unit provides control pressure on a dedicated port for controlling the governor and the purge valve is controlled together with a regeneration phase of the air-drying unit, in particular of the desiccant cartridge.

BRIEF SUMMARY

It is therefore an object of the present invention to provide a cost-effective air processing unit specifically designed for electronically controlled compressors.

The inventors have realized that, since electronically controlled compressors do not require a pneumatic signal, the pneumatic signal for providing a control pressure that typically comes from the air processing unit or the air drying unit is not needed anymore.

A first aspect of the present invention is formed by an air processing unit for providing compressed air to a supply port, in particular for use in a pneumatic system that includes a pneumatic unit pneumatically connected to the supply port, preferably wherein the pneumatic system is adapted for a vehicle. The air processing unit comprises an inlet port for receiving the compressed air, in particular from an electrically controlled compressed air supply. The air processing unit also comprises an air drying unit that includes an input port that is pneumatically connected to the inlet port, and wherein the air drying unit is configured to dry the compressed air received via the inlet port. The air processing unit further comprises a supply line configured to exchange, in particular supply, dried compressed air between the air drying unit and the supply port, and a return pneumatic line configured to exchange, in particular return, compressed air from the supply port to the air drying unit, in particular from the supply line to the air drying unit. In the air processing unit of the first aspect of the invention, an electrically controlled valve is arranged between a first section of the return pneumatic line that is connected to the supply port and a second section of the return pneumatic line that is connected to the air drying unit, and a purge valve is configured to control a flow of purge air via a pneumatic exhaust line, wherein the pneumatic exhaust line pneumatically connects the input port of the air drying unit to an exterior via an exhaust port.

In an air drying phase, dried compressed air is supplied via the supply line from the air drying unit to the supply port, and, in a regeneration phase, returned compressed air is returned via the return pneumatic line from the supply port to the air drying unit. In the air processing unit according to the first aspect of the invention, a return flow control unit comprises the electrically controlled valve and is arranged and configured to enable, during the regeneration phase a flow of the returned compressed air in dependence of an electric control signal, from the return pneumatic line, via the electrically controlled valve, and via the supply line and the air drying unit to the pneumatic exhaust line.

According to the invention, the electrically controlled valve is provided as a single and only electrically controlled valve of the return flow control unit, thus providing a cost-effective air processing unit specifically designed for electronically controlled compressors, that is configured as to include only one electrically controlled valve to control the regeneration phase.

In the scope of this patent, the air processing unit provides no pneumatic control of the compressed air supply unit, e.g. a compressor. Other systems further comprise a solenoid valve for controlling the provision of the control signal to the governor. Removing this solenoid valve allows for cost optimization of the air-processing unit.

In the following, developments of the air processing unit of the first aspect of the present invention will be described.

In a preferred development, the electrically controlled valve is provided as the single and only electrically controlled valve of the whole air-processing unit. Alternatively, in another development, the air-processing unit comprises other electrically controlled solenoid valves, but that do not control a flow of return compressed air from the supply port into the air processing unit.

In another preferred development, the electrically controlled valve is a 3/2-way solenoid valve that is operable, in particular against a spring force, in dependence on the electric control signal, in a non-energized state, in which the return pneumatic line is interrupted, and in an energized state, in which the return pneumatic line fluidly connects the supply port to the air drying unit.

In another development, the supply line between the air drying unit and the supply port comprises a one-way valve arranged and configured to prevent flow from the supply port to the air drying unit via the supply line. In this development, the electrically controlled valve is arranged at the return pneumatic line that bridges the one-way valve.

In yet another development, the purge valve is a pneumatically-controlled dual control valve, wherein a first pressure control input is fluidly connected to the input port of the air drying unit and a second pressure control input is fluidly connected to an outlet port of the electrically controlled valve. Thus, when the pressure value at both the first and the second pressure control inputs are above a predetermined pressure threshold value, which can be the same, or different for both pressure control inputs, the purge valve operates in a state in which the pressurized air exits the air-processing unit via the exhaust port.

In another development, the pneumatically controlled dual control valve is a 2/2-way valve having a relaxed state in which an exhaust line between the input port of the air drying unit and the exhaust port is disconnected and a actuated state in which the exhaust line is available, and wherein the pneumatically controlled dual control valve is configured to change from the relaxed state to the actuated state when a respective pressure amount at the first pressure control input and the second pressure control input is above a respective pressure threshold amount.

In an alternative development, the purge valve comprises a single pressure control input that is fluidly connected to an outlet port of the electronically controlled valve, and is thus the only control pressure for the purge valve. In this development only the pressure amount at the outlet port of the electronically controlled valve controls the purge valve. When the pressure value at the outlet port exceeds a predetermined threshold value the purge valve operates in a state in which the pressurized air exits the air-processing unit via the exhaust port. Once the pressure value at the outlet port is below the predetermined threshold value the purge valve changes its state thereby closing the fluid communication between the input port of the air-drying unit and the exhaust port.

In yet another embodiment, the air processing unit further comprises a charging valve that is arranged between the inlet port and the input port of the air drying unit and configured to allow provision of compressed air to the air drying unit when an compressed air pressure value at the inlet port is higher than a predetermined input pressure threshold amount.

A second aspect of the present invention is formed by an air managing system that comprises an air processing unit in accordance with the first aspect and a multi-circuit protection valve unit that comprises an input port connected to the supply port of the air processing unit and a plurality of output ports that are connectable to respective pneumatic unit of a pneumatic system.

The multi-circuit protection valve unit is a valve unit arranged and configured to retain a safe working pressure in intact circuits of a multiple circuit system, such as a braking system having a plurality of braking units, or a suspension system having a plurality of suspension units, when one of the circuits of the multiple circuit system has failed. In particular, a three-circuit protection valve or a four-circuit protection valve are preferred.

According to a third aspect of the invention, a pneumatic system for a vehicle is described. The pneumatic system comprises an air processing unit in accordance with the first aspect of the present invention, an electrically controlled compressed air supply unit that is connected to the inlet port of the air processing unit, and configured to supply compressed air thereto, at least one pneumatic unit connected to the supply port of the air processing unit, an electronic control unit signally connected to the electrically controlled valve and to the electrically controlled compressed air supply unit and configured to control operation of the electrically controlled valve by generating and providing the electric control signal and to control operation of the compressed air supply unit.

The pneumatic system of the third aspect thus shares the advantages of the air processing unit of the first aspect of the invention. In the following, developments of the inventive pneumatic system will be described.

In a development, the pneumatic unit is a braking unit for supplying pressurized air to a brake, a suspension unit for supplying pressurized air to a suspension, an inflation unit for supplying pressurized air to an inflation port, particularly for tires, or any combination thereof.

In a development of the pneumatic system, the electrically controlled compressed air supply unit comprises a compressor having a compressor input port for receiving air, the compressor being pneumatically connected to the inlet port and being driven by an electrically controlled motor, that is signally connected to the electronic control unit.

In another development, the signal connection between the electronic control unit and the electrically controlled compressed air supply unit and the electrically controlled valve is enabled by a controller area network (CAN) bus. A controller area network (CAN bus) is a robust vehicle bus standard designed to allow microcontrollers and devices to communicate with each other's applications without a host computer. It is a message-based protocol, designed originally for multiplex electrical wiring within automobiles to save on copper, but it can also be used in many other contexts. For each device, the data in a frame is transmitted sequentially but in such a way that if more than one device transmits at the same time, the highest priority device can continue while the others back off. Frames are received by all devices, including by the transmitting device.

A fourth aspect of the present invention is formed by a vehicle, in particular commercial vehicle, more particularly an autonomous, connected, electric vehicle (AEC vehicle), comprising a pneumatic system according the third aspect of the invention, in particular wherein the pneumatic system includes, as the pneumatic unit one or more of a braking system, a suspension system, and a tire-inflation system.

It shall be understood that a preferred embodiment of the present invention can also be any combination of the dependent claims or above embodiments with the respective independent claim.

These and other aspects of the invention will be apparent from and elucidated with reference to the embodiments described hereinafter.

The embodiments of the invention are described in the following on the basis of the drawings in comparison with the state of the art, which is also partly illustrated. The latter is not necessarily intended to represent the embodiments to scale. Drawings are, where useful for explanation, shown in schematized and/or slightly distorted form. With regards to additions to the lessons immediately recognizable from the drawings, reference is made to the relevant state of the art. It should be borne in mind that numerous modifications and changes can be made to the form and detail of an embodiment without deviating from the general idea of the invention. The features of the invention disclosed in the description, in the drawings and in the claims may be essential for the further development of the invention, either individually or in any combination.

In addition, all combinations of at least two of the features disclosed in the description, drawings and/or claims fall within the scope of the invention. The general idea of the invention is not limited to the exact form or detail of the preferred embodiment shown and described below or to an object which would be limited in comparison to the object claimed in the claims. For specified design ranges, values within the specified limits are also disclosed as limit values and thus arbitrarily applicable and claimable.

BRIEF DESCRIPTION OF DRAWINGS

The foregoing aspects and many of the attendant advantages will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

Figure 1:
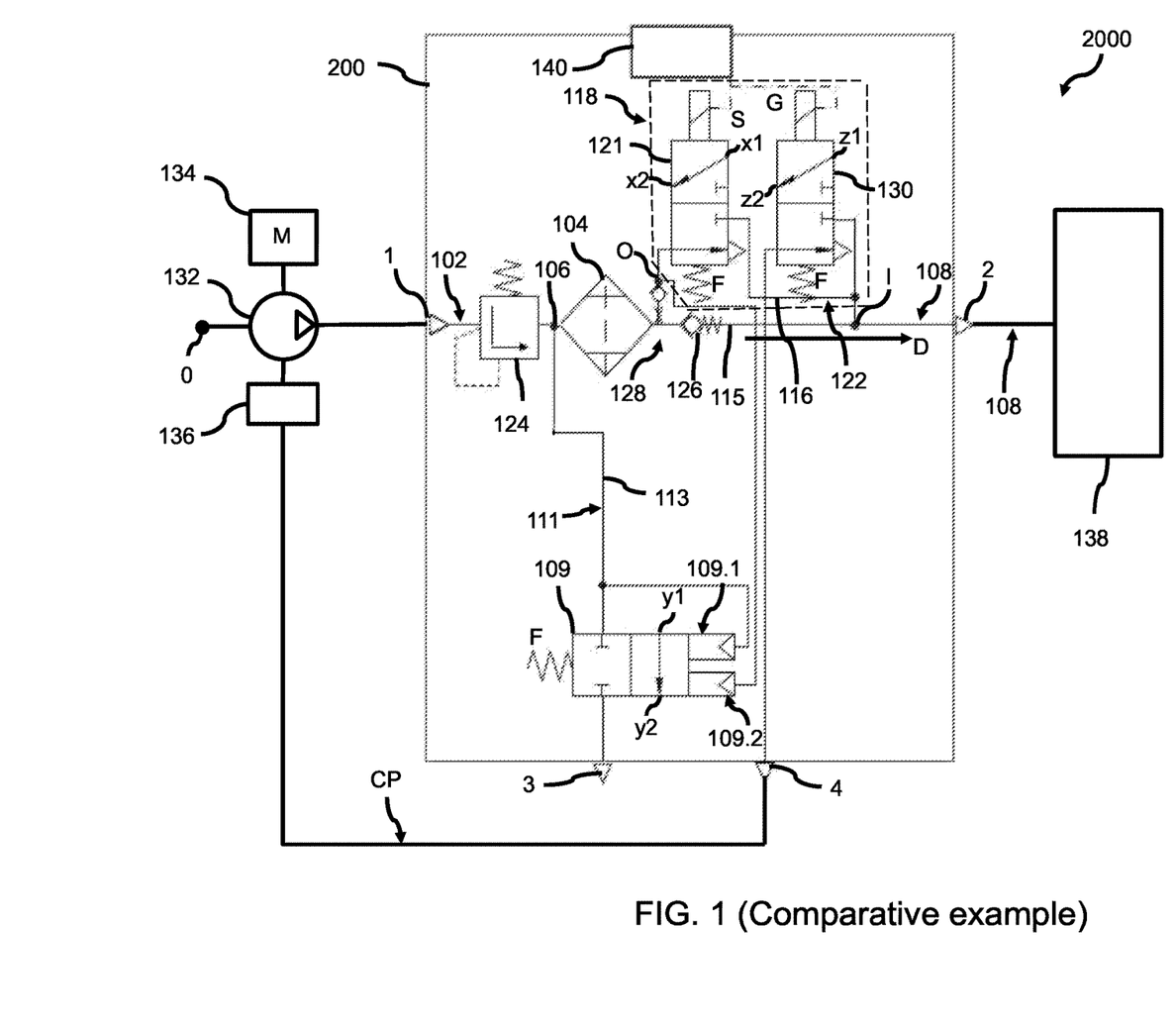
FIG. 1 shows a schematic block diagram of a comparative example of a pneumatic system including an air processing unit configured to provide a control pressure signal to a governor for pneumatically controlling operation of an air compressor.
Figure 3:
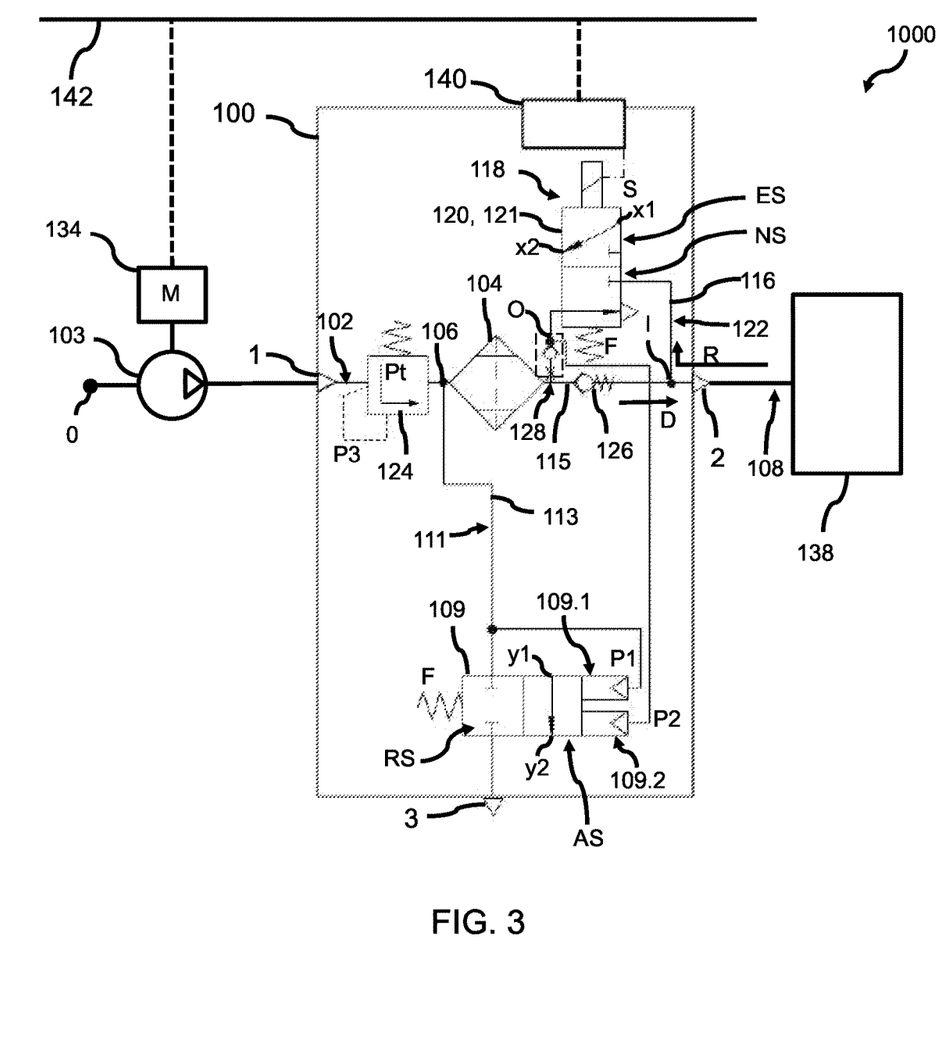
FIG. 3 shows a schematic block diagram of a second embodiment of a pneumatic system comprising an air processing unit according to the invention.
Figure 4:
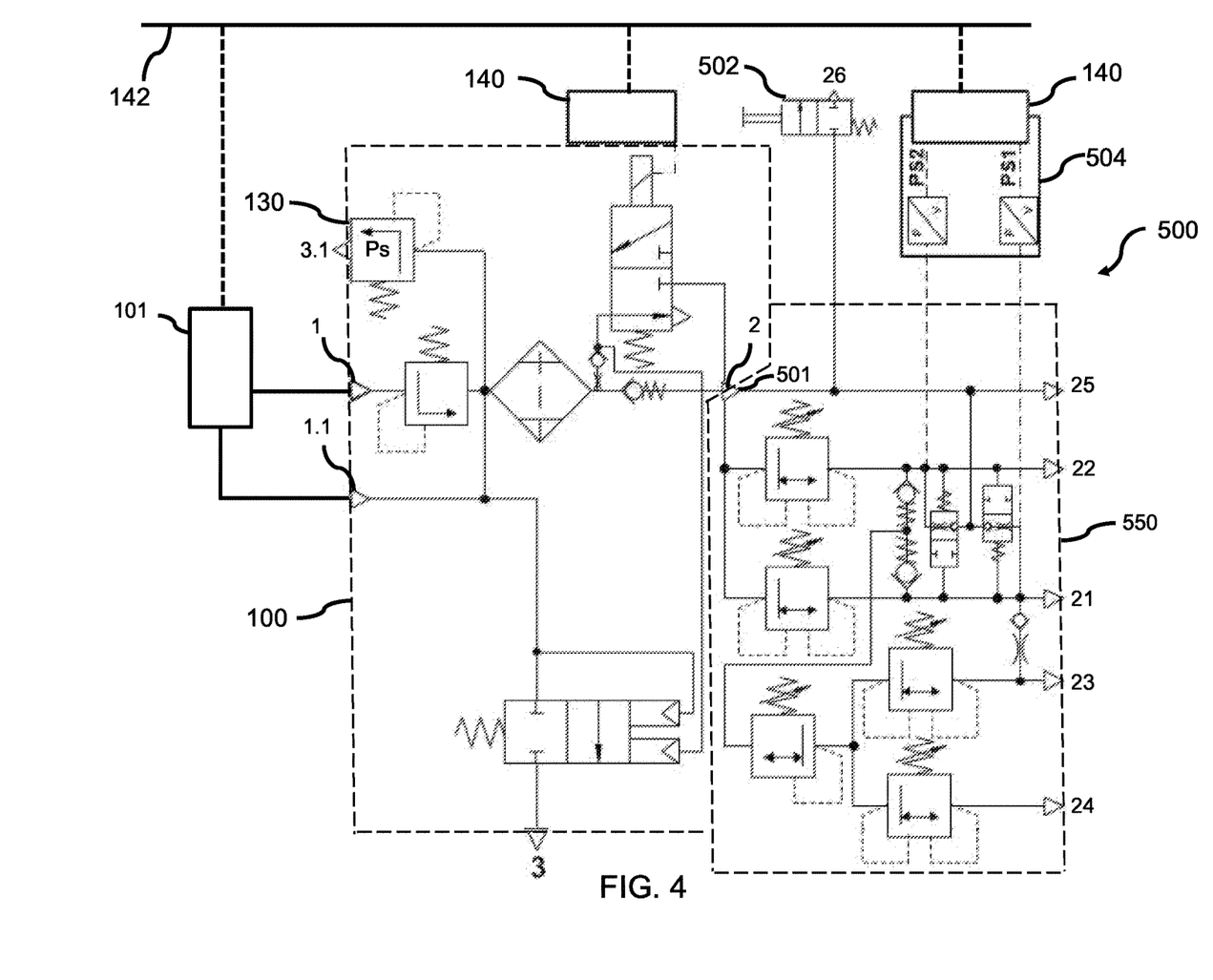
FIG. 4 shows a schematic block diagram of an air managing unit that includes a processing unit according to the invention and a multi-circuit protection valve unit.

FIGS. 1, 3, and 4 include pneumatic diagrams that comprise drawings and functional symbols known to the person skilled in the art. The drawing symbols and functional symbols are to be interpreted in accordance with the standard DIN 74253 and/or DIN ISO 1219.

FIG. 1 shows a schematic block diagram of a comparative example of pneumatic system 2000 including an air processing unit 200 configured to provide a control pressure signal CP via a governor port 4 to a governor 136 for pneumatically controlling operation of an air compressor 132, in particular a pneumatically controllable air compressor, but that is also currently used in combination with electrically controllable air compressors. The air compressor 132 is operated by a motor 134 and is configured to take ambient air via an input port 0 of the compressor 132 and to provide compressed air 102 to an inlet port 1 of the air processing unit 200. The air processing unit comprises an air drying unit 104 arranged and configured, in so-called drying phase D, to dry the received compressed air 102 and to provide dried compressed air to a supply line 115 that connects the air drying unit to a supply port 2 of the air processing unit 200. The dried compressed air is provided to a pneumatic unit 138 of the pneumatic system 2000, such as, for example, a braking unit or a suspension unit of a vehicle. The air drying unit 104 is also operable in a so-called regeneration phase, in which dried compressed air is provided by the pneumatic unit 138 and flows from the supply port 2 via a return flow control unit 118 that includes two electrically controlled solenoid valves 121 and 130. The return flow control unit 118 has an input port I connected to the supply line proximate the supply port 2, and an output port O connected to the supply line 115 proximate the air drying unit. This connection is preferably done via a check valve and/or a throttle unit 128. The return flow control unit is thus advantageously arranged to bypass a check valve 126 in the supply line, which is arranged to stop a flow of return air from the supply port 2 to the air drying unit 104 via the supply line 115, and control a return flow of dried air 122 via a return line 116 by means of the solenoid valve 121. The solenoid valve 130 controls a pneumatic connection between the input port I and the governor port 4 for pneumatically controlling the governor 136. The electric signals S and G, which control operation of the solenoid valves 121 and 130 respectively, are provided, for instance, by an electronic control unit 140. Electric signal G controls solenoid valve 130, which in a 3/2-way solenoid valve with two states and 3 ports. Upon reception of the electric signal G, the solenoid valve 130 is energized and a pneumatic connection between the input port I and the governor port 4 is enabled by connecting the ports z1 and z2 of the solenoid valve 130. This provides a pneumatic control pressure signal CP to the governor 136. Provision of the electric signal S to the solenoid valve 121, which is also a 3/2-way solenoid valve, opens a pneumatic connection between the input port I and the output port O by connecting the ports x1 and x2 of the solenoid valve 121, which bridges the check valve 126 in the supply line 115 and enables a return flow of dried compressed air from the pneumatic unit 138 via the supply port 2 to the air drying unit during a regeneration phase. The output port O of the return flow control unit 118 and the input port 106 of the air drying unit are connected to a pneumatically-controlled dual control valve 109, acting as a purge or exhaust valve, wherein a first pressure control input 109.1 is fluidly connected to the input port 106 of the air drying unit 104 and a second pressure control input 109.2 is fluidly connected to the outlet port O of the return flow control unit. When the pressure value at both the first and the second pressure control inputs 109.1 and 109.2 is above a respective predetermined value (identical or not), ports y1 and y2 of the controlled dual control valve 109 are connected and the exhaust or purge air 111 used in the regeneration phase to regenerate the desiccant material of the air drying unit 104 is exhausted via the exhaust line 113 to the exhaust port 3. The pneumatic system 2000 may also comprise a charging valve 124 arranged between the inlet port 1 and the input port 106 of the air drying unit 104.

Figure 2:
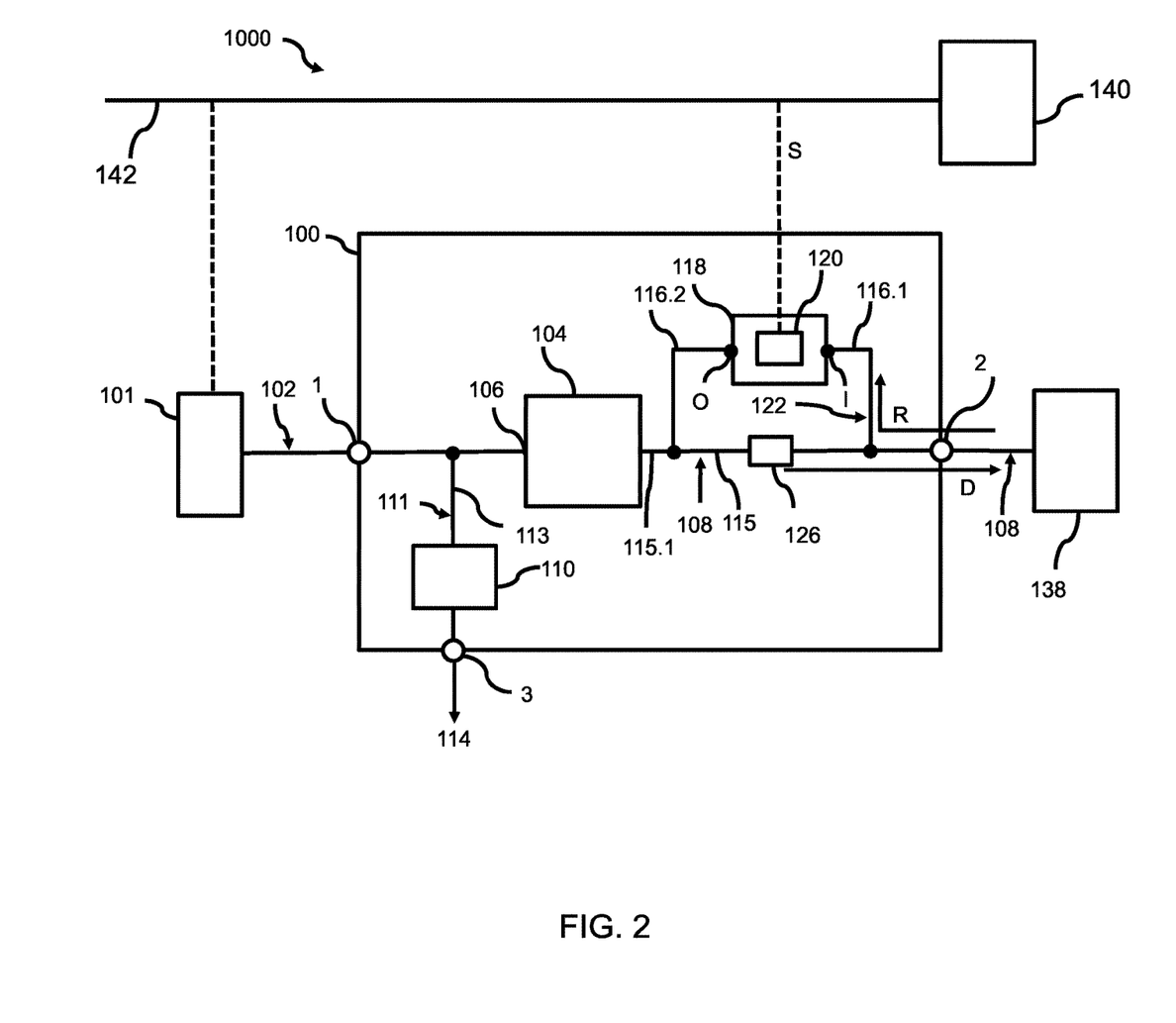
FIG. 2 shows a schematic block diagram of a first embodiment of a pneumatic system comprising an air processing unit according to the invention.

FIG. 2 shows a schematic block diagram of a first embodiment of a pneumatic system 1000 comprising an air processing unit 100 according to the invention. The air processing unit 100 is adapted for providing compressed air 108 to a supply port 2, in particular for use in the pneumatic system that includes a pneumatic unit 138 that is pneumatically connected to the supply port 2. Preferably, the pneumatic system 1000 is adapted for a vehicle (see 1100, FIG. 4). The air processing unit 100 comprises an inlet port 1 for receiving the compressed air 102 from a compressed air supply, in particular from an electrically controlled compressed air supply 101. The air processing unit also comprises an air drying unit 104 having an input port 106 that is pneumatically connected to the inlet port 1 and configured to dry the compressed air 102 received, and a supply line 115 that is configured to exchange, in particular supply, dried compressed air 108 between the air drying unit 104 and the supply port 2. The air processing unit also comprises a return pneumatic line 116 (see FIG. 3) that is configured to exchange, in particular return, compressed air 108 from the supply port 2 to the air drying unit 104, in particular from the supply line 115 to the air drying unit 104. An electrically controlled valve 120 is arranged between a first section 116.1 of the return pneumatic line 116 that is connected to the supply line 115 proximate the supply port 2 and a second section 116.2 of the return pneumatic line 116 that is connected to the supply line 115 proximate the air drying unit 105. Further, a purge valve 110 is configured to control a flow of purge air or exhaust air 111 via a pneumatic exhaust line 113. The pneumatic exhaust line 113 pneumatically connects the input port 106 of the air drying unit 104 to an exterior 114 via an exhaust port 3 and the purge valve 110.

In an air drying phase D, dried compressed air 108 is supplied via the supply line 115, from the air drying unit 104 to the supply port 2. In a regeneration phase R, returned compressed air 108 is returned via the return pneumatic line 116 from the supply port 2 to the air drying unit 104. A return flow control unit 118 comprises the electrically controlled valve 120 and is arranged and configured to enable, during the regeneration phase R, a flow 122 of the returned dried compressed air, via the return line 116, in dependence of an electric control signal, i.e., from the first section of the return pneumatic line 116.1, via the electrically controlled valve 120, via the second section of the return line 116.2, to a section of the supply line 115.1 proximate the air drying unit 104 to the air drying unit 104 and then to the pneumatic exhaust line 113 as exhaust or purge air 111.

In the air processing unit, in contrary to the comparative example shown in FIG. 1, the electrically controlled valve 120 is provided as a single and only electrically controlled valve of the return flow control unit 118. Further, in this particular air processing unit 100, the electrically controlled valve 120 is provided as a single and only electrically controlled valve of the air-processing unit 100. However, in other exemplary air processing unit, additional electrically controlled valves are provided that do not control a return flow of compressed air from the supply port 2, and are thus not part of the return flow control unit 118.

Further, in the air processing unit 100, the supply line 115 between the air drying 104 unit and the supply port 2, comprises a one-way valve or check valve 126 arranged and configured to prevent flow from the supply port 2 to the air drying unit 104 via the supply line 115. Thus, the electrically controlled valve 120 is arranged at the return pneumatic line 116 that bridges the one-way valve 126.

The pneumatic system 1000 comprises an electrically controlled compressed air supply 101, e.g. an electrically controlled compressor, which, contrary to the pneumatically controlled compressor 132 of FIG. 1, does not require a pneumatic control line for the governor 136. The electrically controlled compressor is electrically controlled by an electronic control unit 140, which also provides the electric control signal S to the return flow control unit. In the exemplary air processing unit 100 of FIG. 1, the electrically controlled compressor 101 and the electrically controlled valve 120 are connected to the electronic control unit 140 via a CAN bus 142.

FIG. 3 shows a schematic pneumatic circuit describing of second embodiment of a pneumatic system 1000 comprising an air processing unit 100 according to the invention. Reference is made here to the discussion of the examples of FIG. 2 and FIG. 3. Features having identical or similar functions will be referred to using the same reference numbers. The pneumatic system 1000 of FIG. 3 comprises an electrically controlled compressor 103 that is operated by a motor M connected to an electronic control unit 140 via a CAN bus 142. The solenoid valve 121 is the only electrically controlled valve 120 of the return flow control unit 118, and is arranged to control, e.g. enable or disable, a pneumatic connection along a return line 116 between the input port I and the output port O of the return flow control unit 118, in dependence on the electric control signal S and against a spring force F. The electrically controlled valve 120 is in the air processing unit 100 of FIG. 3, a 3/2-way solenoid valve 121 that is operable against a spring force F, in dependence on the electric control signal S, in a non-energized state NS, in which the return pneumatic line 116 is interrupted, and in an energized state ES, in which the return pneumatic line 116 fluidly (i.e. pneumatically) connects the supply port 2 to the air drying unit 104 by connecting the ports x1 and x2 of the 3/2-way solenoid valve 121.

The supply line 115 comprises, between the air drying 104 unit and the supply port 2, a one-way valve 126 arranged and configured to prevent flow from the supply port 2 to the air drying unit 104 via the supply line 115. The 3/2-way solenoid valve 121 is arranged at the return pneumatic line 116 that bridges the one-way valve 126.

In the air processing unit 100 of FIG. 3, the pneumatically controlled dual control valve 109 is a 2/2-way valve that is operable in a relaxed state RS in which the exhaust line 113 between the input port 106 of the air drying unit 104 and the exhaust port 3 is disconnected and in an actuated state AS in which the exhaust line 113 is available i.e. pneumatically connected to the exhaust port 3. The pneumatically controlled dual control valve 109 is configured to change from the relaxed state RS to the actuated state when a respective pressure amount P1, P2 at the first pressure control input 109.1 and the second pressure control input 109.2 is above a respective pressure threshold amount, which can be but is not necessarily identical for both ports. In FIG. 1, the first pressure control input 109.1 is connected to the exhaust line 113. The second pressure control input is connected to the output port O of the return flow control unit 118.

In another development (not shown), the purge valve 109 comprises a single pressure control input 109.2 that is fluidly connected to an outlet port x2 of the electrically controlled valve 120. i.e. to the outlet port O of the return flow control unit 118, and is the only control pressure for the purge valve 109.

Further, the air processing unit 100 of FIG. 3 optionally further comprises an input charging valve 124 that is arranged between the inlet port 1 and the input port 106 of the air drying unit 104 and configured to allow provision of compressed air 102 to the air drying unit 104 when an compressed air pressure value P3 at the inlet port 1 is higher than a predetermined input pressure threshold amount Pt.

FIG. 4 shows a schematic block diagram of an embodiment of an air managing system 500 comprising an air processing unit 100 according to the invention and a multi-circuit protection valve unit 550. For the description of the air processing unit 100 reference is made to the explanation of FIG. 3. The air-processing unit optionally further comprises a charging valve 130 that is connected to an auxiliary output port 3.1 that is used as a security valve. Whenever the pressure at the input port of the air drying unit is above a security threshold value Ps, the charging valve allows a flow of compressed air through the auxiliary output port 3.1. Further, the air processing unit comprise an auxiliary inlet port 1.1. that bridges the charging valve arranged between the inlet port 1 and the air drying unit. The air managing system 500 further comprises a multi-circuit protection valve (MCPV) unit 550, in particular a four-circuit protection valve unit that has an input port 501 connected to the supply port 2 of the air processing unit, and a plurality of output ports, in this case four ports 21, 22, 23 and 24 that are protected by the multi-circuit protection valve unit 550 against a failure in one of them. For example, the four ports 21, 22, 23 and 24 can be connected to a four-circuit air braking system. Dried compressed air provided by the air processing unit via the supply port 2 passes through the check valves of the MCPV unit 550 into the four circuits of the system. Simultaneously, pressure builds up below the charging valves, opening the charging valves after reaching a respective set opening pressure (protection pressure). Compressed air then flows through ports 21 and 22, for example to air reservoirs of a first circuit and a second circuit of a service-brake system, and through ports 23 and 24 into a third and a fourth circuit respectively. The third circuit, for example, supplies compressed air to the emergency an parking-brake system of the vehicle (truck) and, optionally, to the trailer supply line, and the fourth circuit supplies compressed air to the auxiliary systems.

For example, if one of the service brake systems fails (e.g. circuit 1 connected to port 23), air flows from the other three circuits into the failed circuit until the dynamic valve closes pressure is reached. If air is consumed in circuits 2, 3, or 4, refilling will occur to the level of the set opening pressure of the failed circuit, Pressure protection of the intact circuits takes place in the same way if another circuit fails.

The air managing system may also comprise an output port 25 that is directly connected to the supply port 2 and a inflation port 26, that is actuated by a manually operable valve 502. The air managing system further comprises a pressure sensing unit 504 signally connected to the MCPV unit 550 for determining a pressure amount at predetermined output ports (e.g. ports 21 and 22). The pressure sensing unit 504 is signally connected to the electronic control unit 140.

Figure 5:
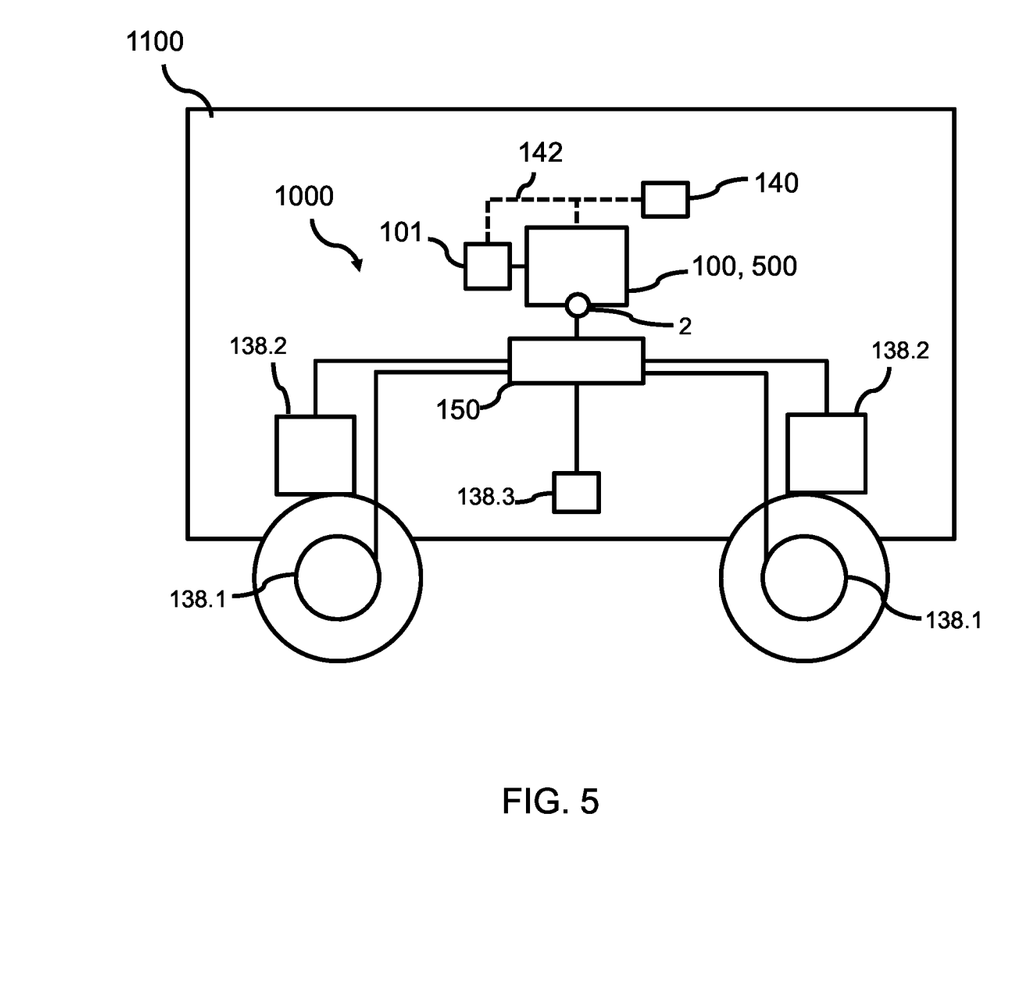
FIG. 5 shows a schematic block diagram of a vehicle including a pneumatic system comprising an air processing according with the invention.

FIG. 5 shows a schematic block diagram of a vehicle 1100 including a pneumatic system 1000 comprising an air processing 100, or an air managing system 500 according with the invention, as explained with reference to FIGS. 2 and 3 and FIG. 4 respectively, to which an electrically controlled compressor 101 is connected. The compressor 101 and the air processing unit 100 are connected to an electronic control unit 140 via a dedicated signal connection, for example a CAN bus 142. The supply port 2 (or the output ports—e.g., 21, 22—of the air managing system 500) are connected to an air reservoir 150 that is configured to store dried compressed air and to provide said stored dried compressed air to one or more pneumatic units of the pneumatic system 1000. FIG. 5 exemplarily shows, as the pneumatic unit, braking units 138.1 of a braking system, suspension units 138.2 of a suspension system, and a tire-inflation unit 138.3 of a tire-inflation system.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

LIST OF REFERENCE SIGNS (PART OF THE DESCRIPTION)

0 Input port of compressed air supply/compressor
1 Inlet port of air processing unit
1.1 Auxiliary inlet port
2 Supply port of air processing unit
3 Exhaust port of air processing unit
3.1 Auxiliary output port
4 Governor port of comparative example
21 Output port of multi-circuit protection valve unit
22 Output port of multi-circuit protection valve unit
23 Output port of multi-circuit protection valve unit
24 Output port of multi-circuit protection valve unit
25 Output port of air managing system
26 Inflation port of air managing system
200 Air processing unit for pneumatic control of governor
100 Air processing unit
101 Electrically controlled compressed air supply unit
103 Compressor of the electrically controlled compressed air supply unit
102 Compressed air
104 Air drying unit
106 Input port of air drying unit
108 Dried compressed air
109 Pneumatically controlled dual-control valve
109.1 First pressure control input of dual-control valve
109.2 Second pressure control input of dual-control valve
110 Purge valve
111 Exhaust air/Purge air
113 Exhaust line
114 Exterior of the air processing unit
115 Supply line
115.1 Section of supply line
116 Return line
116.1 First section of return line
116.2 Second section of return line
118 Return flow control unit
120 Electrically controlled valve
121 3/2-way solenoid valve
122 Return flow of dried air
124 Input charging valve
126 One-way valve/Check valve
128 Check valve and/or throttle unit
130 3/2-way solenoid valve
132 Pneumatically controlled compressor
134 Motor
136 Governor
138 Pneumatic unit
138.1 Braking unit
138.2 Suspension unit
138.3 Inflation unit
140 Electronic control unit
142 CAN bus
150 Air reservoir
500 Air managing system
501 Input port of multi-circuit protection valve unit
502 Manually operable valve
504 Pressure sensing unit
550 Multi-circuit protection valve unit
1000 Pneumatic system
1100 Vehicle
2000 Pneumatic system with air processing unit for pneumatic control of governor
AS Actuated state of purge valve/dual-control valve
RS Relaxed state of purge valve/dual-control valve
CP Control pressure signal
D Flow during drying phase
ES Energized state of solenoid valve
F Spring force
G Electric control signal for solenoid 130
I Input port of return flow control unit
M Motor
NS Non-energized state of solenoid valve
O Output port of return flow control unit P1 First pressure amount at first control input of dual-control valve
P2 Second pressure amount at first control input of dual-control valve
P3 Compressed air pressure value at input port
Pt Input pressure threshold amount
Ps Security threshold value
S Electric control signal for solenoid 121
x1 Port of solenoid valve 121
x2 Port of solenoid valve 121
y1 Port of dual-control valve
y2 Port of dual-control valve
z1 Port of solenoid valve 130
z2 Port of solenoid valve 130

The invention claimed is:

1. An air processing unit for providing compressed air to a supply port of a pneumatic system with a pneumatic unit pneumatically connected to the supply port, comprising:
an inlet port for receiving the compressed air from an electrically controlled compressed air supply;
an air drying unit having an input port pneumatically connected to the inlet port and configured to dry the compressed air received, and
a supply line configured to exchange dried compressed air between the air drying unit and the supply port and a return pneumatic line configured to exchange compressed air of the supply port from the supply line to the air drying unit, wherein
an electrically controlled valve is arranged between a first section of the return pneumatic line that is connected to the supply port and a second section of the return pneumatic line that is connected to the air drying unit, and
a purge valve configured to control a flow of purge air via a pneumatic exhaust line, wherein the pneumatic exhaust line pneumatically connects the input port of the air drying unit to an exterior via an exhaust port; and wherein
in an air drying phase dried compressed air is supplied via the supply line from the air drying unit to the supply port, and
in a regeneration phase returned compressed air is returned via the return pneumatic line from the supply port to the air drying unit, wherein
a return flow control unit comprises the electrically controlled valve and is arranged and configured to enable, during the regeneration phase, a flow of the returned compressed air, in dependence of an electric control signal, from the return pneumatic line via the electrically controlled valve and via the supply line and the air drying unit to the pneumatic exhaust line;
and wherein
the electrically controlled valve is provided as a single and only electrically controlled valve of the return flow control unit.

2. The air processing unit of claim 1, wherein the electrically controlled valve is provided as a single and only electrically controlled valve of the air-processing unit.

3. The air processing unit of claim 1, wherein the electrically controlled valve is a 3/2-way solenoid valve that is operable against a spring force, in dependence on the electric control signal, in
a non-energized state, in which the return pneumatic line is interrupted, and in
an energized state, in which the return pneumatic line fluidly connects the supply port to the air drying unit.

4. The air processing unit of claim 1, wherein the supply line between the air drying unit and the supply port comprises a one-way valve arranged and configured to prevent flow from the supply port to the air drying unit via the supply line, and wherein the electrically controlled valve is arranged at the return pneumatic line that bridges the one-way valve.

5. The air processing unit of claim 1, wherein the purge valve is a pneumatically-controlled dual control valve wherein a first pressure control input is fluidly connected to the input port of the air drying unit and a second pressure control input is fluidly connected to an outlet port of the electrically controlled valve.

6. The air processing unit of claim 1, wherein the purge valve comprises a single pressure control input that is fluidly connected to an outlet port of the electrically controlled valve, and is the only control pressure for the purge valve.

7. The air processing unit of claim 5, wherein the pneumatically controlled dual control valve is a 2/2-way valve having a relaxed state in which an exhaust line between the input port of the air drying unit and the exhaust port is disconnected and an actuated state in which the exhaust line is pneumatically connected to the exhaust port, and wherein the pneumatically controlled dual control valve is configured to change from the relaxed state to the actuated state when a respective pressure amount at the first pressure control input and the second pressure control input is above a respective pressure threshold amount.

8. The air processing unit of claim 1, further comprising an input charging valve arranged between the inlet port and the input port of the air drying unit and configured to allow provision of compressed air to the air drying unit when an compressed air pressure value at the inlet port is higher than a predetermined input pressure threshold amount.

9. Air managing system, comprising
an air processing unit in accordance with claim 1, and
a multi-circuit protection valve unit having an input port connected to the supply port of the air processing unit and a plurality of output ports connectable to respective pneumatic units of a pneumatic system.

10. A pneumatic system for a vehicle, comprising:
an air processing unit of claim 1;
an electrically controlled compressed air supply unit connected to the inlet port of the air processing unit, and configured to supply compressed air;
at least one pneumatic unit connected to the supply port of the air processing unit or to at least one of a plurality of output ports of a multi-circuit protection valve unit;
an electronic control unit signally connected to the electrically controlled valve and to the electrically controlled compressed air supply unit and configured to control operation of the electrically controlled valve by generating and providing the electric control signal and to control operation of the compressed air supply unit.

11. The pneumatic system of claim 10, wherein the electrically controlled compressed air supply unit comprises a compressor having a compressor input port for receiving air, the compressor being pneumatically connected to the inlet port and being driven by an electrically controlled motor, that is signally connected to the electronic control unit.

12. The pneumatic system of claim 10, where the signal connection between the electronic control unit and the electrically controlled compressed air supply unit and the electrically controlled valve is enabled by a controller area network bus.

13. A commercial vehicle, comprising a pneumatic system according to claim 10, wherein the pneumatic system includes, as the pneumatic unit, one or more of a braking unit, a suspension unit, or a tire-inflation unit.

* * * * *